(12) United States Patent
Sheth et al.

(10) Patent No.: US 8,547,966 B2
(45) Date of Patent: Oct. 1, 2013

(54) METHOD AND APPARATUS FOR CONFIGURING IP MULTIMEDIA SUBSYSTEM NETWORK ELEMENTS

(75) Inventors: Niral Sheth, Austin, TX (US); Arshad Khan, Austin, TX (US); Chaoxin Qiu, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 188 days.

(21) Appl. No.: 12/960,918

(22) Filed: Dec. 6, 2010

(65) Prior Publication Data

US 2012/0140764 A1 Jun. 7, 2012

(51) Int. Cl.
*H04L 12/66* (2006.01)
(52) U.S. Cl.
USPC .......................................... 370/352
(58) Field of Classification Search
USPC .......................... 370/467, 492, 494, 352–355
See application file for complete search history.

(56) References Cited

U.S. PATENT DOCUMENTS

| | | | | |
|---|---|---|---|---|
| 7,440,444 B2 * | 10/2008 | Nishida et al. | ............... | 370/352 |
| 7,620,036 B2 * | 11/2009 | Kobayashi et al. | ........... | 370/352 |
| 7,882,226 B2 * | 2/2011 | Collins | ........... | 709/225 |
| 7,957,366 B2 * | 6/2011 | Kaizawa et al. | ........... | 370/352 |
| 7,991,142 B2 * | 8/2011 | Nakai | ........... | 379/219 |
| 8,045,541 B2 * | 10/2011 | Nishida et al. | ........... | 370/352 |
| 8,184,002 B2 * | 5/2012 | Zhang et al. | ........... | 340/540 |
| 8,195,147 B2 * | 6/2012 | Bonnet et al. | ........... | 455/422.1 |
| 2002/0057668 A1 * | 5/2002 | Bos et al. | ........... | 370/349 |
| 2005/0071455 A1 | 3/2005 | Collins | | |
| 2005/0180317 A1 * | 8/2005 | Shimada | ........... | 370/217 |
| 2005/0226230 A1 * | 10/2005 | Dorenbosch | ........... | 370/352 |
| 2007/0213078 A1 * | 9/2007 | Shaheen | ........... | 455/466 |
| 2008/0212569 A1 * | 9/2008 | Terrill et al. | ........... | 370/352 |
| 2008/0231355 A1 * | 9/2008 | Lee | ........... | 329/319 |
| 2008/0256244 A1 * | 10/2008 | Tu et al. | ........... | 709/227 |
| 2008/0285735 A1 * | 11/2008 | Ravishankar et al. | ... | 379/207.02 |
| 2009/0067439 A1 * | 3/2009 | Yamamoto et al. | ........... | 370/400 |
| 2009/0119699 A1 * | 5/2009 | Crassous et al. | ........... | 725/25 |
| 2010/0014512 A1 * | 1/2010 | Kobayashi et al. | ........... | 370/352 |
| 2010/0031290 A1 * | 2/2010 | Hua et al. | ........... | 725/39 |
| 2010/0128707 A1 * | 5/2010 | Horio et al. | ........... | 370/338 |
| 2010/0150140 A1 * | 6/2010 | Britsch | ........... | 370/352 |
| 2010/0153567 A1 * | 6/2010 | Lu et al. | ........... | 709/229 |
| 2010/0154030 A1 * | 6/2010 | Montemurro et al. | ........... | 726/1 |
| 2010/0238503 A1 * | 9/2010 | Sakuda et al. | ........... | 358/1.15 |
| 2010/0299191 A1 * | 11/2010 | Fernandez Gutierrez | ... | 705/14.5 |
| 2010/0316047 A1 * | 12/2010 | Takenouchi et al. | ........... | 370/352 |
| 2011/0028130 A1 * | 2/2011 | Swaminathan et al. | ... | 455/414.1 |
| 2011/0047233 A1 * | 2/2011 | Park et al. | ........... | 709/206 |
| 2011/0134843 A1 * | 6/2011 | Noldus et al. | ........... | 370/328 |
| 2011/0158132 A1 * | 6/2011 | Robbins | ........... | 370/260 |
| 2011/0194554 A1 * | 8/2011 | Gavita et al. | ........... | 370/352 |
| 2011/0228761 A1 * | 9/2011 | Miyata et al. | ........... | 370/352 |
| 2011/0286389 A1 * | 11/2011 | Atarius et al. | ........... | 370/328 |

(Continued)

*Primary Examiner* — Luat Phung
*Assistant Examiner* — Syed S Ali
(74) *Attorney, Agent, or Firm* — Guntin & Gust, PLC; Andrew Gust

(57) ABSTRACT

A system that incorporates teachings of the present disclosure may include, for example, a method for receiving initial filter criteria from a home subscriber server, transmitting information obtained from the initial filter criteria to a domain name system, receiving a multicast IP address from the domain name system, and transmitting a message to a plurality of IP multimedia subsystem network elements according to the multicast IP address. The message can be used for configuring the plurality of IP multimedia subsystem network elements. Other embodiments are disclosed.

16 Claims, 4 Drawing Sheets

(56) References Cited

U.S. PATENT DOCUMENTS

2012/0011273 A1* 1/2012 Van Elburg et al. .......... 709/238
2012/0030039 A1* 2/2012 Fernandez Gutierrez . 705/14.73
2012/0042026 A1* 2/2012 Park et al. ..................... 709/206
2012/0166652 A1* 6/2012 Bouthemy .................... 709/227
2012/0254311 A1* 10/2012 Lee et al. ...................... 709/204

* cited by examiner

200

US 8,547,966 B2

METHOD AND APPARATUS FOR CONFIGURING IP MULTIMEDIA SUBSYSTEM NETWORK ELEMENTS

FIELD OF THE DISCLOSURE

The present disclosure relates generally to configuring network elements and more specifically to a method and apparatus for configuring IP multimedia subsystem network elements.

BACKGROUND

When a communication device submits a request to be registered in an IP multimedia subsystem (IMS) network a number of network elements of the IMS network, such as application servers, are notified of the registration to configure communication services for the communication device. Similarly, when the IMS network deregisters the communication device the application servers along with a proxy call session control function device serving the communication device are notified of the deregistration in order to disable communication services made available to the communication device. Each of the above IMS network elements is notified in separate communication sessions of the registration or deregistration of the communication device.

DETAILED DESCRIPTION

The present disclosure describes, among other things, illustrative embodiments for configuring IMS network elements assigned to a multicast group. Other embodiments are contemplated by the present disclosure.

One embodiment of the present disclosure describes a tangible computer-readable storage medium having computer instructions at least to receive a SIP registration message initiated by a communication device, transmit to a home subscriber server a request associated with the SIP registration message, receive initial filter criteria associated with the communication device from the home subscriber server, obtain a multicast IP address according to the initial filter criteria, and transmit a registration message to a plurality of IP multimedia subsystem network elements according to the multicast IP address.

One embodiment of the present disclosure describes a method for receiving initial filter criteria from a home subscriber server, transmitting information obtained from the initial filter criteria to a domain name system, receiving a multicast IP address from the domain name system, and transmitting a message to a plurality of IP multimedia subsystem network elements according to the multicast IP address. The message can be used for configuring the plurality of IP multimedia subsystem network elements.

One embodiment of the present disclosure describes a call session control function device having a processor, and a memory storing computer instructions that, when executed by the processor, cause the processor to receive a SIP registration message initiated by a communication device, receive from a home subscriber server initial filter criteria associated with the communication device, obtain according to the initial filter criteria a multicast address, and transmit a registration message to a plurality of IP multimedia subsystem network elements according to the multicast address.

Figure 1:
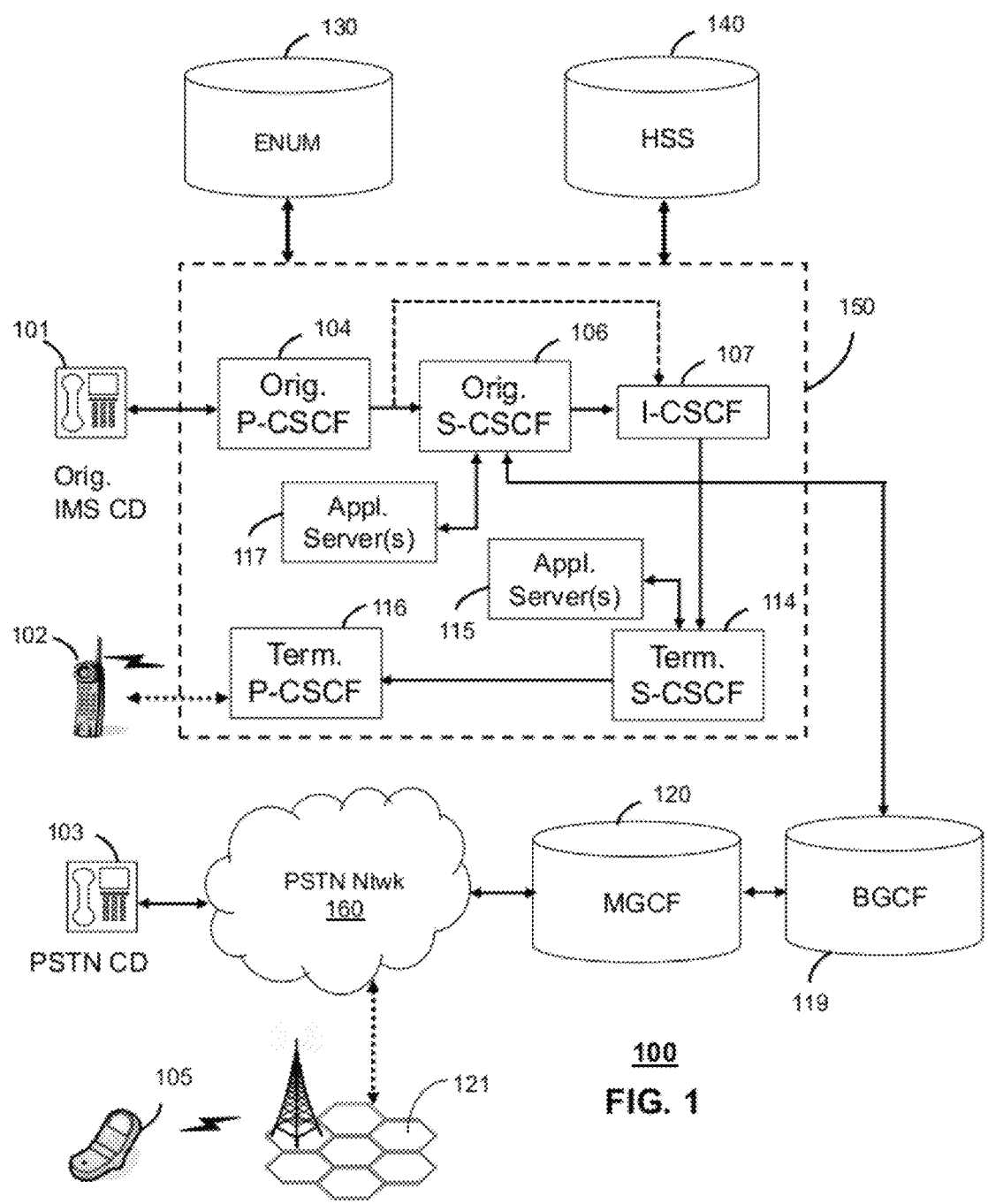
FIG. 1 depicts illustrative embodiments of a communication system.

FIG. 1 depicts an illustrative embodiment of a communication system 100 employing an Internet Protocol Multimedia Subsystem (IMS) network architecture to facilitate the combined services of circuit-switched and packet-switched communication systems. Communication system 100 can comprise a Home Subscriber Server (HSS) 140, a tElephone NUmber Mapping (ENUM) server 130, and other common network elements of an IMS network 150. The IMS network 150 can establish communications between IMS-compliant communication devices (CDs) 101, 102, Public Switched Telephone Network (PSTN) CDs 103, 105, and combinations thereof by way of a Media Gateway Control Function (MGCF) 120 coupled to a PSTN network 160. The MGCF 120 is used for communication session involving at least one PSTN CD.

IMS CDs 101, 102 can register with the IMS network 150 by contacting a Proxy Call Session Control Function (P-CSCF) which communicates with an interrogating CSCF, which in turn, communicates with a Serving CSCF (S-CSCF) to register the CDs with the HSS 140. To initiate a communication session between CDs, an originating IMS CD 101 can submit a Session Initiation Protocol (SIP INVITE) message to an originating P-CSCF 104 which communicates with a corresponding originating S-CSCF 106. The originating S-CSCF 106 can submit the SIP INVITE message to one or more application servers (AS) 117 that can provide a variety of services to IMS subscribers.

For example, the application servers 117 can be used to perform originating call feature treatment functions on the calling party number received by the originating S-CSCF 106 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 106 can submit queries to the ENUM system 130 to translate an E.164 telephone number in the SIP INVITE message to a SIP Uniform Resource Identifier (URI) if the terminating communication device is IMS-compliant. The SIP URI can be used by an Interrogating CSCF (I-CSCF) 107 to submit a query to the HSS 140 to identify a terminating S-CSCF 114 associated with a terminating IMS CD such as reference 102. Once identified, the I-CSCF 107 can submit the SIP INVITE message to the terminating S-CSCF 114. The terminating S-CSCF 114 can then identify a terminating P-CSCF 116 associated with the terminating CD 102. The P-CSCF 116 may then signal the CD 102 to establish Voice over Internet Protocol (VoIP) communication services, thereby enabling the calling and called parties to engage in voice and/or data communications. Based on the iFCs in the subscriber profile, one or more terminating application servers 115 may be invoked to provide various call terminating feature services, such as call forwarding no answer, do not disturb music tones, simultaneous ringing, sequential ringing, etc.

In some instances the aforementioned communication process is symmetrical. Accordingly, the terms "originating" and "terminating" in FIG. 1 may be interchangeable. It is further noted that the communication system 100 can be adapted to support video conferencing. It is further contemplated that the CDs of FIG. 1 can operate as wireline or wireless devices. The CDs of FIG. 1 can be communicatively coupled to a cellular base station 121, a femtocell (not shown), a WiFi router, a DECT base unit, or another suitable wireless access unit to establish communications with the IMS network 150 of FIG. 1.

If the terminating communication device is instead a PSTN CD such as CD 103 or CD 105 (in instances where the cellular phone only supports circuit-switched voice communications), the ENUM system 130 can respond with an unsuccessful address resolution which can cause the originating S-CSCF 106 to forward the call to the MGCF 120 via a Breakout Gateway Control Function (BGCF) 119. The MGCF 120 can then initiate the call to the terminating PSTN CD over the PSTN network 160 to enable the calling and called parties to engage in voice and/or data communications.

The cellular access base station 121 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Multiple wireline and wireless communication technologies are therefore contemplated for the CDs of FIG. 1.

It is further contemplated that cellular telephones supporting LTE can support packet-switched voice and packet-switched data communications and thus may operate as IMS-compliant devices. In this embodiment, the cellular base station 121 may communicate directly with the IMS network 150.

It will be appreciated that FIG. 1 is not a comprehensive depiction of an IMS network. There may be, for example, many instances of the network elements shown in FIG. 1. Moreover, the interconnection of these network elements can differ depending on a service provider's needs. Thus, other configurations of the communication system 100 are contemplated by the present disclosure Illustrative embodiments of methods that can operate in portions of the communication device of FIG. 1 are described below.

Figure 2:
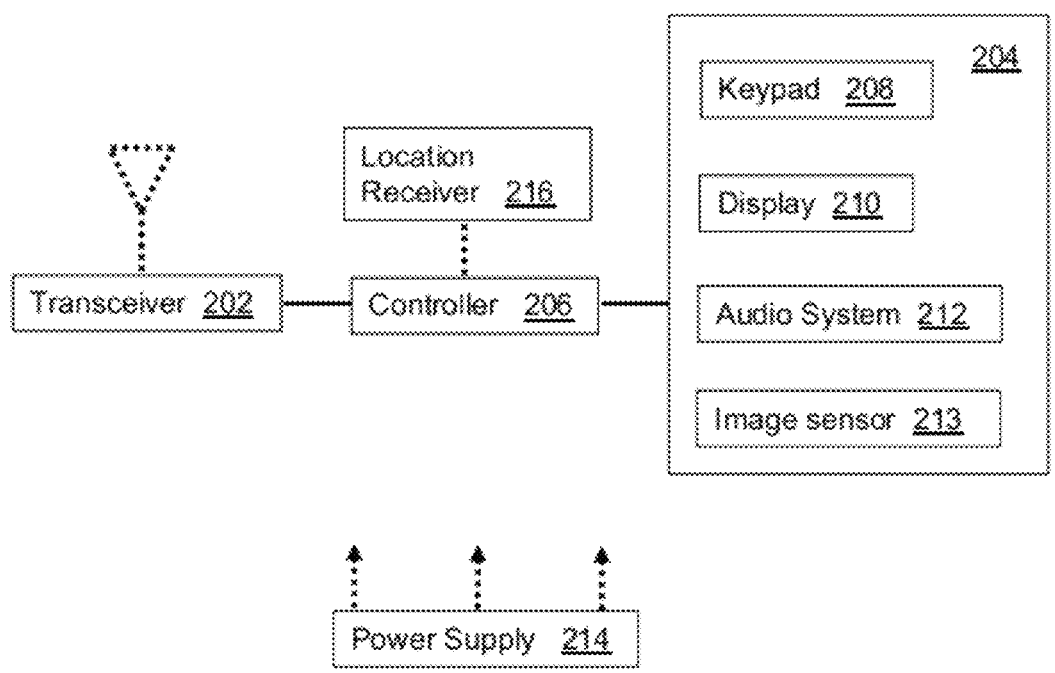
FIG. 2 depicts an illustrative embodiment of a communication device utilized in the communication system of FIG. 1.

FIG. 2 depicts an exemplary embodiment of a communication device 200. Communication device 200 can serve in whole or in part as an illustrative embodiment of the devices depicted in FIG. 1. The communication device 200 can comprise a wireline and/or wireless transceiver 202 (herein transceiver 202), a user interface (UI) 204, a power supply 214, a location receiver 216, and a controller 206 for managing operations thereof. The transceiver 202 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation cellular wireless communication technologies as they arise. The transceiver 202 can also be adapted to support circuit-switched wireline access technologies (such as PSTN), packet-switched wireline access technologies (such as TCPIP, VoIP, etc.), and combinations thereof.

The UI 204 can include a depressible or touch-sensitive keypad 208 with a navigation mechanism such as a roller ball, a joystick, a mouse, or a navigation disk for manipulating operations of the communication device 200. The keypad 208 can be an integral part of a housing assembly of the communication device 200 or an independent device operably coupled thereto by a tethered wireline interface (such as a USB cable) or a wireless interface supporting for example Bluetooth. The keypad 208 can represent a numeric dialing keypad commonly used by phones, and/or a Qwerty keypad with alphanumeric keys. The UI 204 can further include a display 210 such as monochrome or color LCD (Liquid Crystal Display), OLED (Organic Light Emitting Diode) or other suitable display technology for conveying images to an end user of the communication device 200. In an embodiment where the display 210 is touch-sensitive, a portion or all of the keypad 208 can be presented by way of the display 210 with its navigation features.

The UI 204 can also include an audio system 212 that utilizes common audio technology for conveying low volume audio (such as audio heard only in the proximity of a human ear) and high volume audio (such as speakerphone for hands free operation). The audio system 212 can further include a microphone for receiving audible signals of an end user. The audio system 212 can also be used for voice recognition applications. The UI 204 can further include an image sensor 213 such as a charged coupled device (CCD) camera for capturing still or moving images.

The power supply 214 can utilize common power management technologies such as replaceable and rechargeable batteries, supply regulation technologies, and charging system technologies for supplying energy to the components of the communication device 200 to facilitate long-range or short-range portable applications. The location receiver 216 can utilize common location technology such as a global positioning system (GPS) receiver capable of assisted GPS for identifying a location of the communication device 200 based on signals generated by a constellation of GPS satellites, thereby facilitating common location services such as navigation.

The communication device 200 can use the transceiver 202 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 206 can utilize computing technologies such as a microprocessor, a digital signal processor (DSP), and/or a video processor with associated storage memory such a Flash, ROM, RAM, SRAM, DRAM or other storage technologies.

The communication device 200 can be adapted to perform the functions of the IMS CDs 101-102 and PSTN CDs 103-105 of FIG. 1. It will be appreciated that the communication device 200 can also represent other common devices that can operate in communication system 100 of FIG. 1 such as a gaming console and a media player.

Illustrative embodiments of methods that can operate in portions of the communication device of FIG. 2 are described below.

Figure 3:
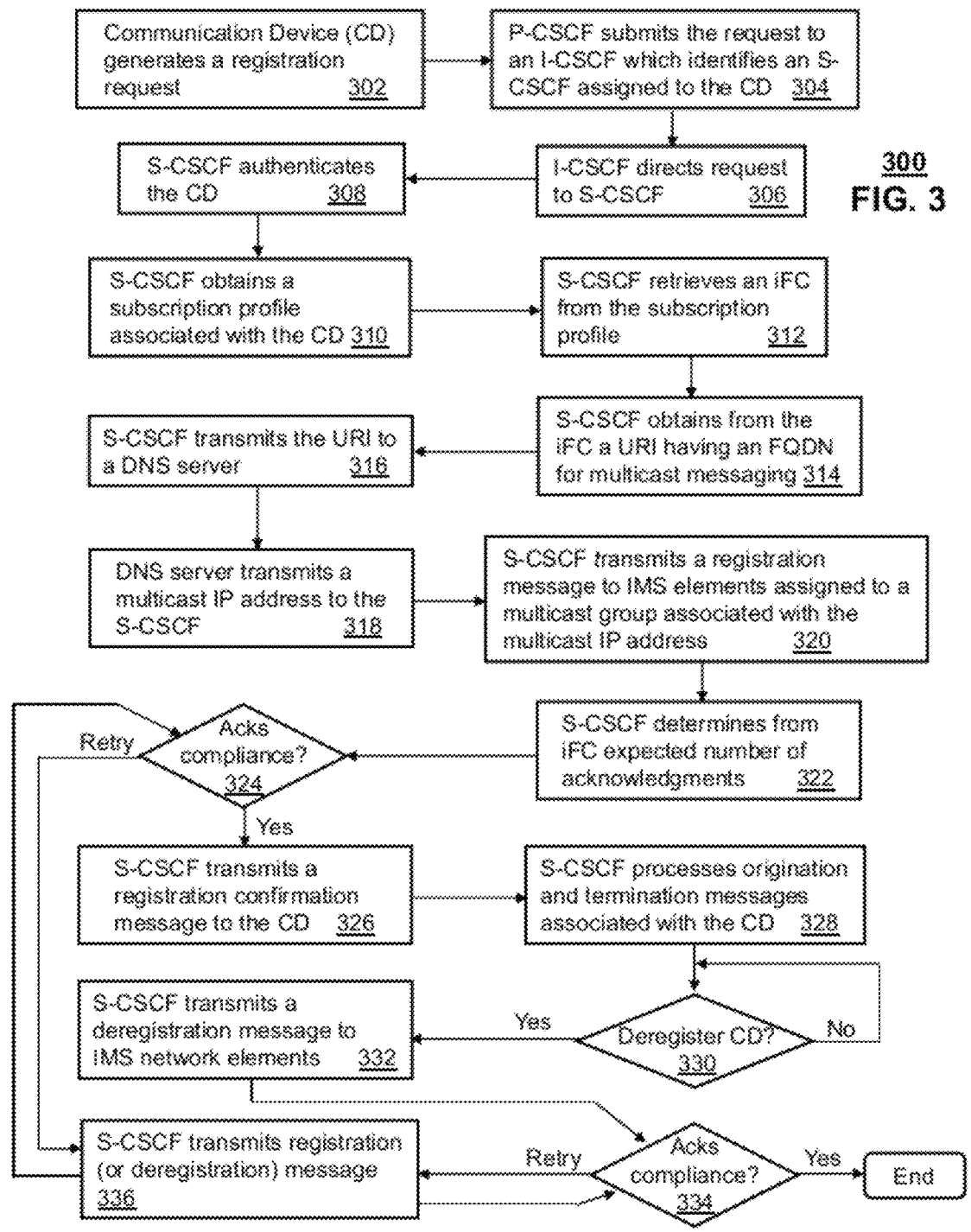
FIG. 3 depicts illustrative embodiments of a method operating in portions of the communication system of FIG. 1.

FIG. 3 depicts an illustrative method 300 that operates in portions of the communication devices and network elements of FIGS. 1-2. For illustration purposes, the communication devices and network elements of communication system 100 of FIG. 1 will be used in the descriptions that follow. Method 300 can begin with step 302 in which a communication device such as CD 101 generates a registration request. A registration request can represent a SIP registration request which is initiated by CD 101 when the device is turned on, or when the CD 101 roams to a P-CSCF which has not previously registered the CD 101. At step 304, the P-CSCF 104 can be adapted to submit the SIP registration message to an I-CSCF 107 which identifies S-CSCF 106 as serving the CD 101 based on information supplied by the HSS 140. In this step, the I-CSCF 107 directs the SIP registration message to the S-CSCF 106 at step 306 for further processing.

The S-CSCF 106, at step 308, can authenticate the CD 101 based on authentication information supplied by the CD 101 that is compared by the S-CSCF 106 to authentication information provided by the HSS 140. Once CD 101 is authenticated, the S-CSCF 106 can obtain from the HSS 140 using DIAMETER messages, at step 310, a subscription profile associated with the CD 101. The subscription profile can include a plurality of initial filter criteria (iFCs) which provide the S-CSCF logical triggers for processing calls originating or terminating at the CD 101. Each iFC can include a fully qualified domain name (FQDN) associated with a multicast group to which a plurality of application servers have been assigned. Each iFC can further include a list of FQDNs specifically identifying each application server belonging to a specific multicast group, and an indicator (such as a flag) to direct the application server to respond or forego a response to a message. Since DIAMETER messaging today does not support the aforementioned structure of iFCs, the DIAMETER messaging protocol would have to be adapted according to the present disclosure.

To register the CD 101 with one or more application servers, the S-CSCF 106 can retrieve the iFC from the subscription profile at step 312. At step 314, the S-CSCF 106 can obtain from the iFC a URI that includes the FQDN associated with the multicast group. The FQDN can be configured in domain name system (DNS) servers of the IMS network 150 (not shown in FIG. 1) to resolve the URI to an IP address assigned to the multicast group.

At step 316, the S-CSCF 106 can transmit the URI to a DNS server which transmits at step 318 a multicast IP address to the S-CSCF 106, which the S-CSCF 106 can use to register the CD 101 with the application servers 117 with a single registration message. The application servers 117 can be pre-assigned by a service provider to the multicast group associated with the multicast IP address to enable multicast communications between the S-CSCF 106 and the application servers 117. At step 320, the S-CSCF 106 can transmit a registration message to the application servers 117 using the multicast IP address. The registration message can include the FQDN assigned to the multicast group, and a list of FQDNs and corresponding indicators (e.g., flags) to instruct each application server whether to respond to the registration message. With the foregoing method, the registration message can invoke the application servers to configure services for the CD 101 with a single message transmission from the S-CSCF 106. Step 320 is in contrast to prior art systems which rely on the S-CSCF to transmit a registration message to each of the application servers in separate communication sessions. Assigning application servers 117 to a multicast group to enable multicast messaging reduces communication latency, reduces application layer complexity, and provides scalability to an unlimited number of IMS network elements assigned to multicast groups.

At step 322, the S-CSCF 106 can be adapted to determine from the indicators (e.g., flags) in the iFC an expected number of acknowledgments to receive from the application servers 117. A service provider can choose to direct the application servers 117 to provide no acknowledgments in cases where the service enabled is non-essential, or require acknowledgment responses from some or all of the application servers. If an acknowledgment response is not expected from any of the application servers 117 according to the indicators provided in the iFC, then the S-CSCF 106 can proceed from step 324 to step 326 where the S-CSCF 106 transmits a registration confirmation message (e.g., SIP OK message) to the CD 101 indicating that the registration process has been successfully completed and the CD 101 may now engage in call originations or terminations.

If, on the other hand, one or more acknowledgments are expected according to the indicators provided in the iFC, the S-CSCF 106 can determine at step 324 if the application server(s) 117 have complied with the acknowledgment protocol established by the service provider as identified in the iFC. If all the acknowledgments have been received, then the S-CSCF 106 proceeds to step 326 where it transmits the registration confirmation message to the CD 101 as previously described. If one or more acknowledgments have not been received within a timeout period (also established by the service provider), the S-CSCF 106 can proceed to step 336 where it transmits a registration message to the unresponsive application server by obtaining a unicast IP address from a DNS server using a URI with the FQDN of the unresponsive application server provided in the iFC. Since other application servers may have responded, it is not necessary to retransmit the registration message to the multicast group. Once all application servers 117 have complied with the expected acknowledgment responses, the S-CSCF 106 proceeds to step 326 to information the CD 101 that the registration process has completed.

Once the CD 101 has successfully registered with the IMS network 150, the S-CSCF 106 can process origination and termination messages associated with the CD 101 at step 328 in the manner previously described. If the S-CSCF 106 receives a deregistration message from an IMS network element (e.g., the HSS 140) at step 330, the S-CSCF 106 proceeds to step 332. A deregistration message can result from a number events including without limitation the CD 101 attempting to register with another portion of the IMS network 150 after a previous and active registration with the P-CSCF 104, a failure of the subscriber of the CD 101 to comply with service provider billing or use policies, or other network conditions or policies established by the service provider. At step 332, the S-CSCF 106 can transmit a deregistration message using the multicast address to all IMS network elements affected by the deregistration of the CD 101, such as without limitation, the P-CSCF 104, the I-CSCF 107, and the application servers 117.

Given the importance of properly deregistering the CD 101 from the IMS network 150, the service provider may configure the iFC so that the S-CSCF 106 is adapted at step 334 to expect acknowledgments from all IMS network elements serving CD 101 directly or indirectly. If all IMS network elements have properly responded at step 334, the S-CSCF 106 ends the deregistration process ends; otherwise, the S-CSCF 106 submits deregistration messages to the unresponsive IMS network elements utilizing their respective unicast IP addresses which can be resolved by a DNS server using the URI with unique FQDN provided for each IMS network element in the iFCs.

Figure 4:
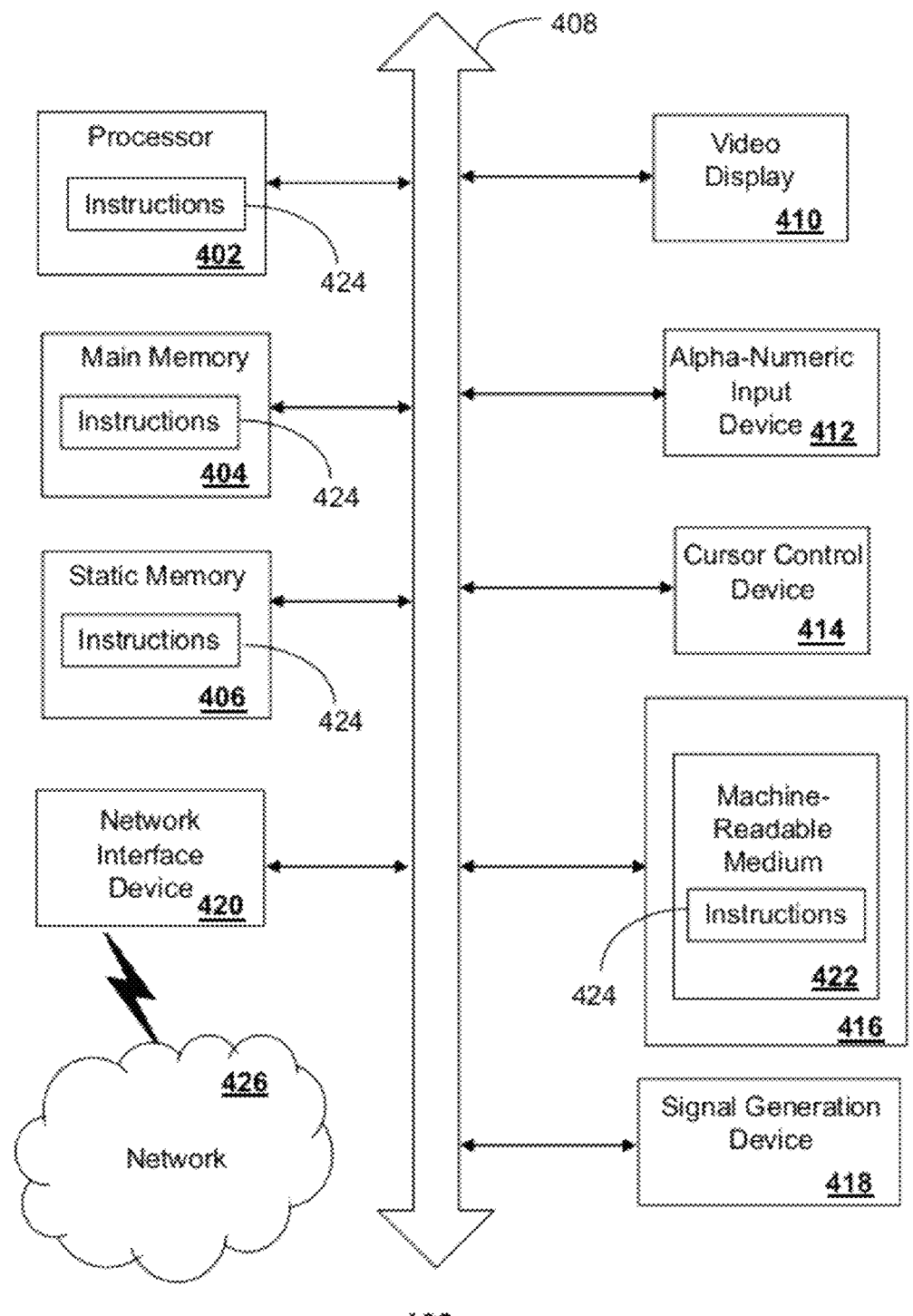
FIG. 4 is a diagrammatic representation of a machine in the form of a computer system within which a set of instructions, when executed, may cause the machine to perform any one or more of the methods discussed herein.

FIG. 4 depicts an exemplary diagrammatic representation of a machine in the form of a computer system 400 within which a set of instructions, when executed, may cause the machine to perform any one or more of the methods discussed above. One or more instances of the machine can operate as the devices illustrated in communication system 100, for example, as the communication devices 101, 102, 103, 105, the network elements of the IMS network 150, and so on. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, or a solid state display. The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a tangible computer-readable storage medium 422 on which is stored one or more sets of instructions (e.g., software 424) embodying any one or more of the methods or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 422 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any medium that is capable of storing, encoding or carrying a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium or a tangible distribution medium, as listed herein and including art-recognized equivalents and successor media, in which the software implementations herein are stored.

The present disclosure further contemplates intangible computer-readable instructions, intangible structured or unstructured data, and/or intangible program modules in a data signal such as a modulated data signal, e.g., a carrier wave or other transport mechanism. The term "modulated data signal" or signals refers to a signal that has one or more of its characteristics changed in such as manner as to encode information in one or more signals. By way of example, and without limitation, transport media may include wired media, such as a wired network or direct-wired connection, and wireless media such as acoustic, RF, infrared or other forms of wireless media.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 400.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions, which when executed by a processor cause the processor to perform operations comprising:
    receiving a session initiation protocol registration message initiated by a communication device;
    transmitting to a home subscriber server a request associated with the session initiation protocol registration message;
    receiving initial filter criteria associated with the communication device from the home subscriber server;
    obtaining from the initial filter criteria a uniform resource identifier including a fully qualified domain name;
    transmitting the uniform resource identifier to a domain name system;
    receiving a multicast internet protocol address from the domain name system based at least on an association between the fully qualified domain name of the uniform resource identifier and the multicast internet protocol address;
    transmitting a registration message to a plurality of internet protocol multimedia subsystem network elements according to the multicast internet protocol address; and
    determining from the initial filter criteria an expected number of acknowledgement responses from the plurality of internet protocol multimedia subsystem network elements; and
    transmitting a registration confirmation message to the communication device responsive to receiving the expected number of acknowledgment responses from the plurality of internet protocol multimedia subsystem network elements.

2. The non-transitory computer-readable storage medium of claim 1, wherein the expected number of acknowledgment responses is equal to or greater than zero acknowledgment responses.

3. The non-transitory computer-readable storage medium of claim 1, wherein the operations further comprise routing a session initiation protocol invite message to an internet protocol multimedia subsystem network element as a unicast message.

4. The non-transitory computer-readable storage medium of claim 1, wherein the registration message corresponds to a third party registration message directed to a multicast group comprising a plurality of application servers.

5. The non-transitory computer-readable storage medium of claim 4, wherein the plurality of application servers are assigned to the multicast group according to a multicast protocol.

6. The non-transitory computer-readable storage medium of claim 5, wherein the multicast protocol corresponds to an internet group management protocol.

7. The non-transitory computer-readable storage medium of claim 1, wherein the plurality of internet protocol multimedia subsystem network elements comprise a plurality of application servers.

8. The non-transitory computer-readable storage medium of claim 7, wherein the plurality of internet protocol multimedia subsystem network elements further comprise a proxy call session control function device.

9. The non-transitory computer-readable storage medium of claim 1, wherein the operations further comprise:
    receiving a request to deregister the communication device; and
    transmitting a deregistration message to the plurality of internet protocol multimedia subsystem network elements according to the multicast internet protocol address.

10. The non-transitory computer-readable storage medium of claim 9, wherein the operations further comprise transmitting a unicast deregistration message to one of the plurality of internet protocol multimedia subsystem network elements failing to submit a response associated with the deregistration message.

11. A method, comprising:
    receiving initial filter criteria from a home subscriber server;
    transmitting information obtained from the initial filter criteria to a domain name system;
    receiving a multicast internet protocol address from the domain name system;
    transmitting a message to a plurality of internet protocol multimedia subsystem network elements according to the multicast internet protocol address, wherein the message configures the plurality of internet protocol multimedia subsystem network elements;
    receiving a registration request from a communication device;
    transmitting to the home subscriber server a request for the initial filter criteria responsive to receiving the registration request;
    determining from the initial filter criteria an expected number of responses from the plurality of internet protocol multimedia subsystem network elements; and
    transmitting a registration confirmation message to the communication device responsive to receiving the expected number of acknowledgment responses from the plurality of internet protocol multimedia subsystem network elements.

12. The method of claim 11, further comprising:
    obtaining from the initial filter criteria a uniform resource identifier including a fully qualified domain name; and
    transmitting the uniform resource identifier to the domain name system; and
    receiving the multicast internet protocol address from the domain name system based at least on an association between the fully qualified domain name and the multicast internet protocol address.

13. The method of claim 11, wherein the expected number of acknowledgment responses is equal to or greater than zero acknowledgment responses.

14. The method of claim 11, further comprising:

receiving a deregistration request;

determining from the deregistration request and a trigger in the initial filter criteria a need to transmit a deregistration message; and transmitting the deregistration message to the plurality of internet protocol multimedia subsystem network elements according to the multicast internet protocol address.

15. A call session control function device, comprising:

a processor; and a memory to store computer instructions that, when executed by the processor, cause the processor to perform operations comprising:

receiving a session initiation protocol registration message initiated by a communication device;

receiving from a home subscriber server initial filter criteria associated with the communication device in a diameter message, wherein the initial filter criteria comprise a fully qualified domain name associated with a multicast group, a fully qualified domain name of each of a plurality of internet protocol multimedia subsystem network elements, and a plurality of indicators for directing none or one of the plurality of internet protocol multimedia subsystem network elements to respond to the registration message;

obtaining a multicast address from a domain name system according to the initial filter criteria; and transmitting a registration message to the plurality of internet protocol multimedia subsystem network elements according to the multicast address;

obtaining from the initial filter criteria a uniform resource identifier including the fully qualified domain name associated with the multicast group; and transmitting the uniform resource identifier to the domain name system; and transmitting the registration message with the fully qualified domain name associated with the multicast group, the fully qualified domain name of each of the plurality of internet protocol multimedia subsystem network elements, and the plurality of indicators for directing none or one of the plurality of internet protocol multimedia subsystem network elements to respond to the registration message.

16. The call session control function device of claim 15, wherein the operations further comprise receiving no responses or one response from the plurality of internet protocol multimedia subsystem network elements, and wherein each the plurality of internet protocol multimedia subsystem network elements perform operations comprising:

detecting the fully qualified domain name and an indicator assigned to the internet protocol multimedia subsystem network element in question; and transmitting or foregoing transmission of a response message to the call session control function device according to the indicator.

* * * * *